US011810126B2

(12) United States Patent
Dai et al.

(10) Patent No.: US 11,810,126 B2
(45) Date of Patent: Nov. 7, 2023

(54) SYSTEM AND METHOD FOR IMPLEMENTING AN INTELLIGENT CUSTOMER SERVICE QUERY MANAGEMENT AND ROUTING SYSTEM

(71) Applicant: JPMorgan Chase Bank, N.A., New York, NY (US)

(72) Inventors: Mike Dai, East Rutherford, NJ (US); Heidi V. Tumey, New Castle, DE (US); Fran Bocain, Holbrook, NY (US); Ramesha Narasappa, Jersey City, NJ (US); Rajesh Kalyanpur, Green Brook, NJ (US); Jignesh M. Patel, Iselin, NJ (US); Keith Mascheroni, Brooklyn, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 1028 days.

(21) Appl. No.: 16/374,888

(22) Filed: Apr. 4, 2019

(65) Prior Publication Data
US 2019/0311374 A1 Oct. 10, 2019

Related U.S. Application Data

(60) Provisional application No. 62/652,452, filed on Apr. 4, 2018.

(51) Int. Cl.
*G06Q 30/016* (2023.01)
*G06F 40/205* (2020.01)
(Continued)

(52) U.S. Cl.
CPC ......... *G06Q 30/016* (2013.01); *G06F 40/205* (2020.01); *G06F 40/279* (2020.01); *G06N 5/02* (2013.01); *G06N 20/00* (2019.01)

(58) Field of Classification Search
CPC .... G06Q 30/016; G06F 40/279; G06F 40/205
See application file for complete search history.

(56) References Cited

U.S. PATENT DOCUMENTS

| | | | |
|---|---|---|---|
| 2015/0039521 A1* | 2/2015 | Schubert | G06Q 30/016 705/304 |
| 2016/0132812 A1* | 5/2016 | Beasley | H04L 51/046 705/7.42 |

(Continued)

OTHER PUBLICATIONS

Son, Gwang, Victor Hazlewood, and Gregory D. Peterson. "On automating XSEDE user ticket classification." Proceedings of the 2014 Annual Conference on Extreme Science and Engineering Discovery Environment. 2014. (Year: 2014).*

*Primary Examiner* — Brendan S O'Shea
(74) *Attorney, Agent, or Firm* — Greenblum & Bernstein, P.L.C.

(57) ABSTRACT

An embodiment of the present invention is directed to an intelligent customer service and query management and routing system. The innovative system comprises a communications server that receives a query from a client; a predictive analytics engine that applies predictive analytics to the query including parsing keywords and phrases; classifying the keywords and phrases; and applying a tag to the query; a management platform dashboard that provides an interface to a customer service representative to provide feedback to the predictive analytics engine and further applies automatic routing and categorization into a plurality of communication inboxes; and a periodic model build processing component that builds, monitors, optimizes and deploys one or more predictive models executed by the predictive analytics engine.

20 Claims, 8 Drawing Sheets

(51) Int. Cl.
*G06F 40/279* (2020.01)
*G06N 5/02* (2023.01)
*G06N 20/00* (2019.01)

(56) References Cited

U.S. PATENT DOCUMENTS

| | | | |
|---|---|---|---|
| 2016/0196561 A1* | 7/2016 | Iyer | G06Q 50/01 |
| | | | 705/304 |
| 2016/0239847 A1* | 8/2016 | Arvapally | G06Q 30/016 |
| 2018/0033019 A1* | 2/2018 | Mora | G06Q 10/063114 |
| 2018/0181901 A1* | 6/2018 | Babcock | G06F 3/0484 |
| 2018/0211260 A1* | 7/2018 | Zhang | G06N 20/00 |
| 2018/0218374 A1* | 8/2018 | Shah | G06Q 30/016 |

* cited by examiner

SYSTEM AND METHOD FOR IMPLEMENTING AN INTELLIGENT CUSTOMER SERVICE QUERY MANAGEMENT AND ROUTING SYSTEM

CROSS REFERENCE TO RELATED APPLICATIONS

The application claims priority to U.S. Provisional Application 62/652,452, filed Apr. 4, 2018, the contents of which are incorporated herein in its entirety.

FIELD OF THE INVENTION

The invention relates generally to a system and method for implementing an intelligent customer service query management and routing system for incoming client communications.

BACKGROUND OF THE INVENTION

Client service representatives and other office representatives receive thousands of client emails on a daily basis into their group email boxes which are then sorted through hard-coded outlook rules with the intention of routing the emails to the appropriate people. With current routing systems, each representative then manually reviews these emails—many of which are not related to the client they cover or their specific area of expertise, and find the ones that they need to action on. The current system involves a laborious and inefficient process that contributes towards longer response times to client inquiries, breached service level agreements (SLAs), and lower client satisfaction. The problem extends to any customer facing role that needs to check client communications whether they are emails, chats or voice calls.

Client service representatives are bombarded with tens of thousands of client service communications (e.g., emails, texts, calls, etc.) through email groups and distribution lists they belong to, as well various other delivery platforms, without a reliable way to filter and track the client service requests that are actionable by them. Current client query assignment, tracking and responses have to be done manually and across multiple systems which results in duplicate work, inefficiencies, and poor response times.

These and other drawbacks exist.

SUMMARY OF THE INVENTION

According to one embodiment, the invention relates to a system that implements an intelligent customer service query management and routing system for incoming client communications. The system comprises: a communications server that receives a query from a client; a predictive analytics engine that applies predictive analytics to the query including parsing keywords and phrases; classifying the keywords and phrases; and applying tags to the query; a management platform dashboard that provides an interface for a customer service representative to provide feedback to the predictive analytics engine and further applies automatic routing and categorization into a plurality of communication inboxes; and a periodic model build processing component that builds, monitors, optimizes and deploys one or more predictive models executed by the predictive analytics engine.

According to another embodiment, the invention relates to a method that implements an intelligent customer service query management and routing system for incoming client communications. The method comprises the steps of: receiving, via a communications server, a query from a client; applying, via a predictive analytics engine, predictive analytics to the query including parsing keywords and phrases; classifying the keywords and phrases; and applying tags to the query; providing, via a management platform dashboard, an interface for a customer service representative to provide feedback to the predictive analytics engine and further applies automatic routing and categorization into a plurality of communication inboxes; and executing, via a periodic model build processing component, one or more predictive models to build, monitor, optimize and deploy one or more predictive models.

The system may include a specially programmed computer system comprising one or more computer processors, interactive interfaces, electronic storage devices, and networks.

The computer implemented system, method and medium described herein provide unique advantages to entities, organizations and other users, according to various embodiments of the invention. The innovative system provides enrichment to business intelligence and communication tools with real-time predictive text analytics for incoming client communications. The system provides automatic reporting of current prediction metrics; automatic phasing out of training data that is no longer relevant; and plug-and-play design of architecture that provides the ability to enhance or replace the underlying model at any time. Moreover, the invention may be applied regardless of language or operational role of the client service representative. An embodiment of the present invention is directed to building a strategic query management platform to streamline middle office processing, facilitating a positive client experience, achieving synergies between middle office and front office and enhancing management oversight of client interactions and SLA performance. These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

FIG. 2 is an exemplary user interface, according to an embodiment of the present invention.

FIG. 7 is an exemplary user interface, according to an embodiment of the present invention.

DETAILED DESCRIPTION OF THE PREFERRED EMBODIMENT(S)

Figure 1:
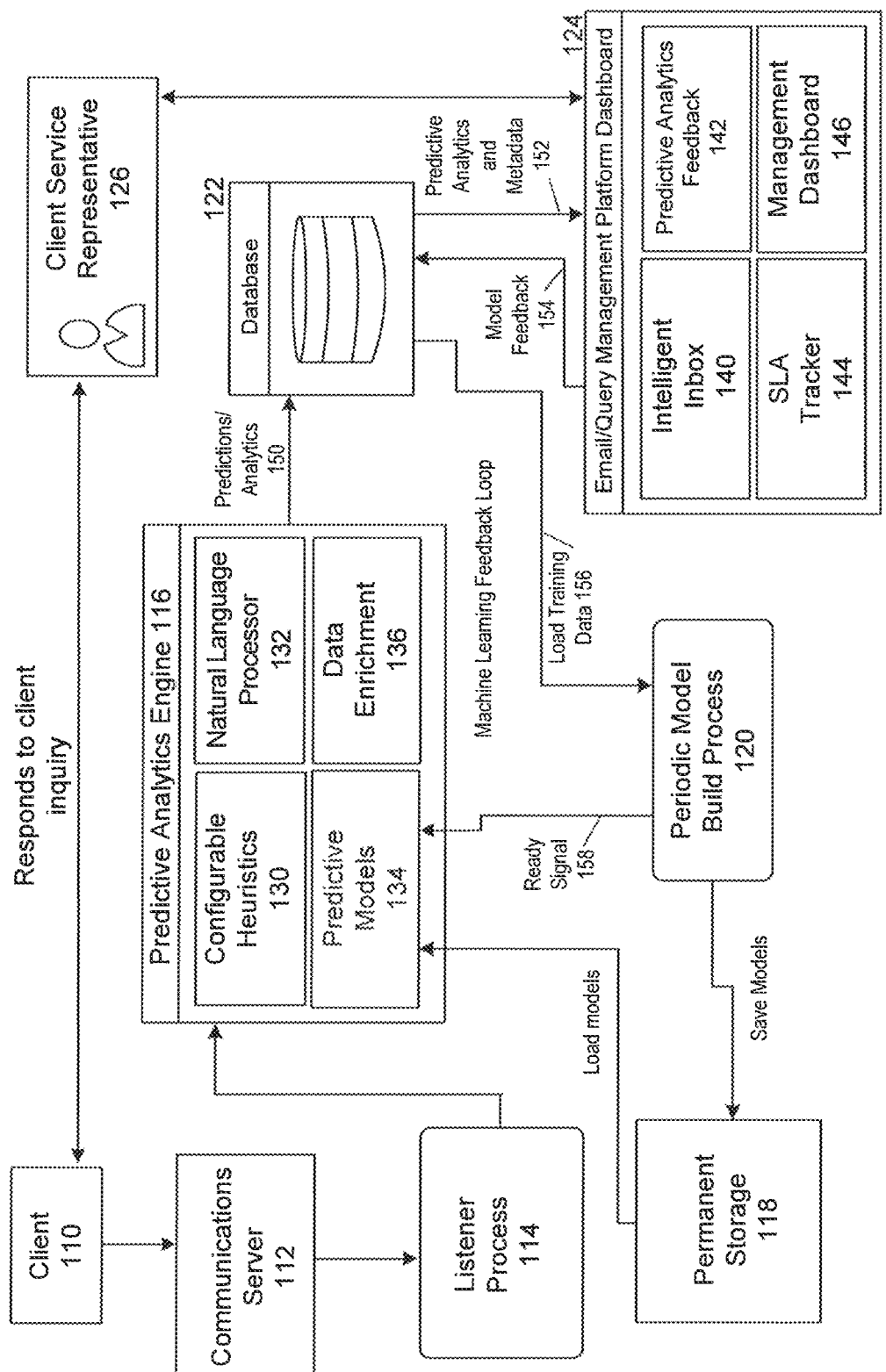
FIG. 1 is an exemplary system architecture, according to an embodiment of the present invention.

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

An embodiment of the present invention is directed to a predictive analytics engine. The engine includes a framework and architecture with a supervised machine learning model that constantly learns based on historic and new labeled text data. The machine learning model tags incoming text with labels, such as urgency, business category and assignment group in real-time. Additional heuristics may be leveraged to enrich predictions based on associated metadata. The architecture is scale-able, traceable and resilient. In addition, the architecture supports plug-and-play of new machine learning models and may be implemented using a variety of software and infrastructure components. With an embodiment of the present invention, users may be presented with real-time text category suggestions, group assignments, urgency ratings as client and other communications arrive thereby reducing work overhead, manual effort, and increasing staff efficiency, and client satisfaction.

According to an embodiment of the present invention, a machine learning model may receive a text stream as input and provide tagged labels (e.g., predictions) as output. According to an exemplary implementation, the machine learning model may be hosted on a Python micro-service. Other implementations and services may be supported. The model may be created on a periodic basis using the latest training data cached in memory ensuring real-time predictions to each communication (e.g., email, chat, text, voice to text, etc.) sent to an application programming interface (API). The parameters for the model may be automatically optimized and calculated at run-time. The engine may be designed to be load balanced across multiple instances allowing for and ensuring availability. The model may include an ensemble classifier comprising a neural net, k-neighbors classifier, a random forest, and/or several regression models which may be optimized at run time. Other classification and regressions models may be applied. Back-testing metrics may be recorded to capture model performance over time, and determine which predictions are being offered by which sub-model for debugging purposes. Previous model images may be stored on disk, for example, and loaded on an application start to ensure rapid deployment and system resilience.

An embodiment of the present invention may be directed to a periodic retraining process to train the model based on user feedback and other data and further update instances of the engine which may occur simultaneously. Specific model construction and parameters may be optimized for the data set at run time. The system may include storage of back testing metrics and old models snapshots. In addition, the system may provide automatic reporting of current prediction metrics; automatic phasing out of training data that is no longer relevant; and plug-and-play design of architecture that provides the ability to enhance or replace the underlying model at any time.

An embodiment of the present invention is directed to making the engine reusable firm wide and beyond. For example, the reusable framework may be configured and built on a cloud service. Accordingly, in this exemplary implementation, users may only need to provide the supporting cloud services, labeled training data, configuration parameters, and post processing logic. An embodiment of the present invention may be considered highly modular and may work with a variety of infrastructure, data, and platform configurations.

An embodiment of the present invention is directed to building a strategic query management platform to streamline client query processing. For example, client query processing may include functions such as: subscribing to client communications streams including emails, chats, Voice-to-Text in real time, and processing these text streams using natural language processing (NLP), and machine learning (ML) to classify and intelligently route it to the right customer service representative. The system may also provide the ability for managers or other users to track and reassign queries within teams and further monitor the queries and responses. The system may include a support structure with a "follow the sun" model which may intelligently reroute queries based on global teams working hours, thereby achieving synergies between different client service desks by utilizing a common platform for managing email queries. The system may use natural language processing and machine learning to recognize structured products, such as financial instruments within text and link them with general ledger and/or trading systems.

An embodiment of the present invention provides automatic routing of client service queries by leveraging machine learning, natural language processing, data inference and/or pre-defined rules. The system may include predictive models that retrain based on continuous user feedback into the platform that improve performance over time. Natural language processing may be implemented to detect tickers, financial instruments, and/or other key data. The system provides automatic capture of back testing metrics to evaluate predictive performance and influencing factors. In addition, the system provides processing and automatic hand-off of client service queries across various communication channels and regions.

FIG. 1 is an exemplary system architecture, according to an embodiment of the present invention. FIG. 1 represents a simplified architecture diagram highlighting the machine learning feedback loop. As shown in FIG. 1, a client 110 may send a query to customer service representative (CSR) 126. For example, client 110 may send a communication that includes "I need this done, When will this happen? Please follow up ASAP." This communication may be received as an email communication, text message, chat message, voice to text communication, portal input as well as other forms of communication. Communications Server 112 may receive emails and other communications. A Listener Process 114 may listen for incoming client communications and send them to a predictive analytics model. Listener Process may forward communication details (e.g., email details) to a Predictive Analytics Engine 116. Predictive Analytics Engine 116 may include Configurable Heuristics 130, Natural Language Processor 132, Predictive Models 134 and Data Enrichment 136.

Configurable Heuristics 130 may apply rules and processing logic affecting outgoing predictions. Natural Language Processor 132 may parse key words and phrases including client names, tickers, etc.

Predictive Models 134 may implement Deep Neural Networks. Predictive Models 134 may load models from storage, such as Permanent Storage 118. Periodic Model Build Process 120 may save models to Permanent Storage 118. Periodic Model Build Process 120 may build and retrain based on latest CSR user feedback. Periodic Model Build Process 120 may send a ready signal to Predictive Models 134 and load training data from Database 122.

Data Enrichment 136 may fetch relevant metadata and other features. Predictive Analytics Engine 116 may communicate with Storage 118, Periodic Model Build Process 120 and Database 122. Machine Learning Feedback Loop may be formed by via Predictive Analytics Engine 116, Database 122, Email/Query Management Platform Dashboard 124 and Periodic Model Build Process 120. For example, Predictive Analytics Engine 116 may perform predictions and analytics and then store the data in Database 122 via 150. Predictive analytics and metadata may be sent to Email/Query Management Platform Dashboard 124, via 152. Model feedback may be sent to Database 122, via 154, and training data may be loaded to Periodic Model Build Process 120, via 156, which may then send a Ready Signal to Predictive Analytics Engine 116, via 158.

Email/Query Management Platform Dashboard 124 may include Intelligent Inbox 140, Predictive Analytics Feedback 142, service level agreements (SLAs) Tracker 144 and Management Dashboard 146. Intelligent Inbox 140 may automatically route and categorize queries into users inbox. Predictive Analytics Feedback 142 may allow the user, e.g., CSR, to provide feedback to the predictions received and help train models. SLA Tracker 144 may track client query SLA to allow prioritization. Management Dashboard 146 may provide oversight to CSR managers and other users.

Email/Query Management Platform Dashboard 124 may provide model feedback to Database 122. Database 122 may provide predictive analytics and metadata. CSR Users may manage customer queries while providing feedback for predictive analytics training.

Customer Service Representative (CSR) 126 may use the query management platform to prioritize their cases, follow up with clients and provide feedback to further train the predictive models. For example, in response to the client's query, CSR may respond with "We are working on it and it will be done for you by end of day today."

Figure 2:
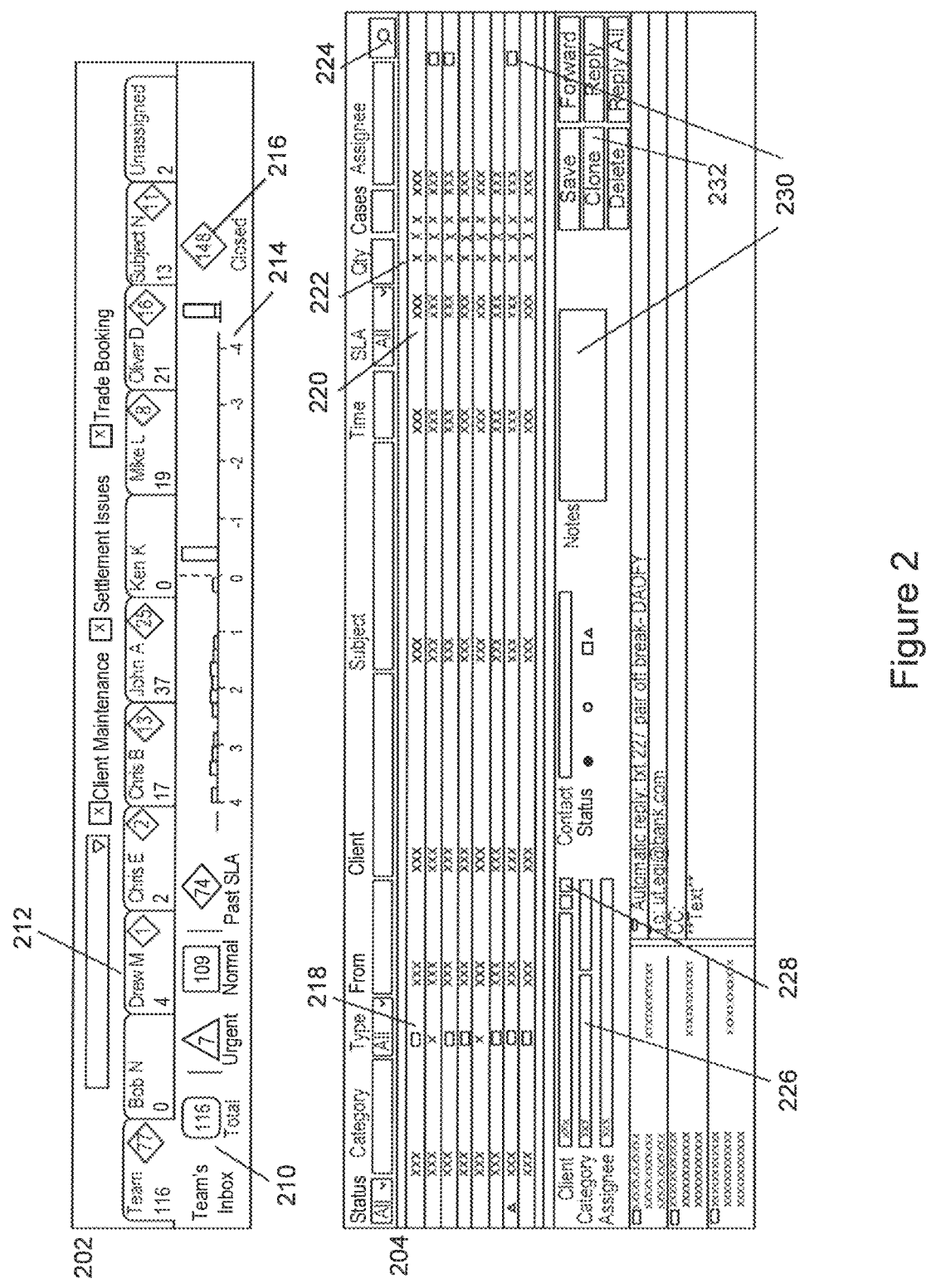

FIG. 2 is an exemplary user interface, according to an embodiment of the present invention. As shown in FIG. 2, the interface comprises an overview at 202 and a detailed view at 204. Team Tab 210 provides a holistic view into the number of open cases, SLA breach and urgent items. The Tabs shown by 212 illustrate intelligent case routing and assignment. Interface 214 provides Service Level Agreement (SLA) histogram representing open cases. In this example, there is a four-hour SLA which means that when an inquiry (e.g., email) comes in, the SLA for indicates that there are four hours to resolve the inquiry. Icon 216 represents a number of cases the team closed in one day (or other time period). Detailed View 204 may include enhanced visual aids at 218, SLA Timer at 220, Email/Case Count at 222 and an Advanced Search at 224. For example, Icon 218 may indicate type of category or communication. SLA Timer 220 may indicate how much time is left to address the particular communication (e.g., −1 hour, 15 minutes). Client name, query type and assignee ownership may be shown at 226. Access to client contact information may be provided at 228. Notes to transfer knowledge and visual aid may be provided by 230. For example, the visual aid at 230 may indicate that there is additional information in the notes section. Other icons and indicators may be provided. The ability to clone to duplicate case is shown at 232.

Figure 3:
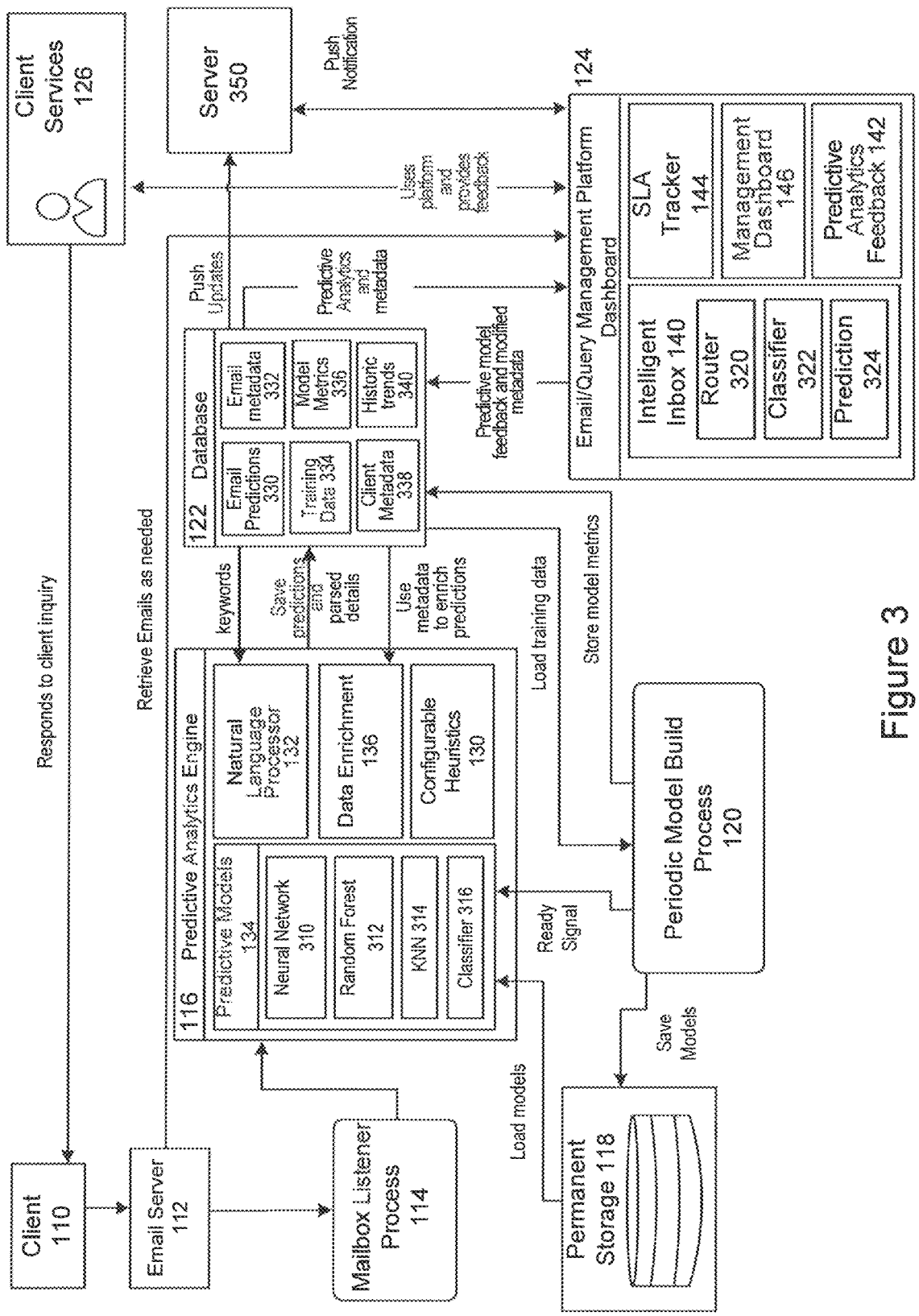
FIG. 3 is an exemplary system architecture, according to an embodiment of the present invention.

FIG. 3 is an exemplary system architecture, according to an embodiment of the present invention. FIG. 3 is a more detailed view of the system illustrated in FIG. 1. As shown in FIG. 3, Periodic Model Build Process 120 may build and retrain based on latest user feedback, perform run-time optimization of model parameters, record performance metrics, save new models to storage, and signal to the analytics engine when done to load the new model. Permanent Storage 118 may store recently built models and historic snapshots and may be persisted and loaded as necessary.

For example, FIG. 3 provides additional details concerning the Predictive Analytics Engine 116, Email/Query Management Platform Dashboard 124 and Database 122. In the exemplary implementation of FIG. 3, Predictive Analytics Engine 116 may execute various Predictive Models represented by 134. Predictive Models 134 may include Neural Networks 310, Random Forest 312, K-Nearest Neighbors (KNN) 314 and Ridge Classifier 316. These are merely exemplary; other classification and regressions models may be implemented. Email/Query Management Platform Dashboard 124 may include Intelligent Inbox 140 which manages email and/or other various communications through Router 320, Classifier 322 and Prediction 324. Intelligent Inbox 140 may route relevant emails (or other communications) to individual inboxes and/or recipients; route group-specific emails (or other communications) to group inboxes; assign category and urgency predictions to emails (or other communications); relabel, reassign, follow, clone and/or close cases. Database 122 may include Email/communication Predictions 330, Metadata 332, Training Data 334, Model Metrics 336, Client Metadata 338 and Historic Trends 340. Data from Email/Query Management Platform Dashboard 124 and Database 122 may be pushed to Server 350.

As shown in FIG. 3, keywords may be transmitted from Database 122 to Natural Language Processor 132. Predictions and parsed details may be managed and stored in Database 122. In addition, metadata from Database 122 may be used to enrich predictions by Data Enrichment 136. Model metrics may be stored from Periodic Model Build Process 120 to Model Metrics 336. Email/Query Management Platform Dashboard 124 may provide predictive model feedback and modified metadata to Database 122. Predictive analytics and metadata may be received by 124. The platform may be used to provide feedback to Client Service 126. In addition, push notifications may be communicated between Email/Query Management Platform Dashboard 124 and Server 350, and also between Database 122 and Server 350.

An embodiment of the present invention is directed to natural language processing, tracking and monitoring, communication and partnership and support sales efforts. Natural language processing provides automated category and urgency level assignment to incoming queries to standardize prioritization for users and further integrates artificial intelligence (AI) to auto-respond to clients inclusive of trade details with potential to auto-repair trades. Tracking and monitoring involves real-time monitoring of client SLAs and open case status inclusive of visible notes to manage risk; provides an ability to "follow cases" giving added visibility into performance and utilizes enhanced visual aids to optimize productivity. Communication and partnership provides seamless knowledge transfer across regions to improve the client experience as well as resolution times and provides integration into core ops systems to improve efficiencies and reduce the number of systems required for users to logon. Support sales efforts may leverage strategic data sources that house client contact and client coverage to bring customer service representatives in alignment with Front Office; allow for the intelligent routing of incoming cases to the proper coverage; and develop trending analysis over time to proactively anticipate and prepare for increased volumes.

Figure 4:
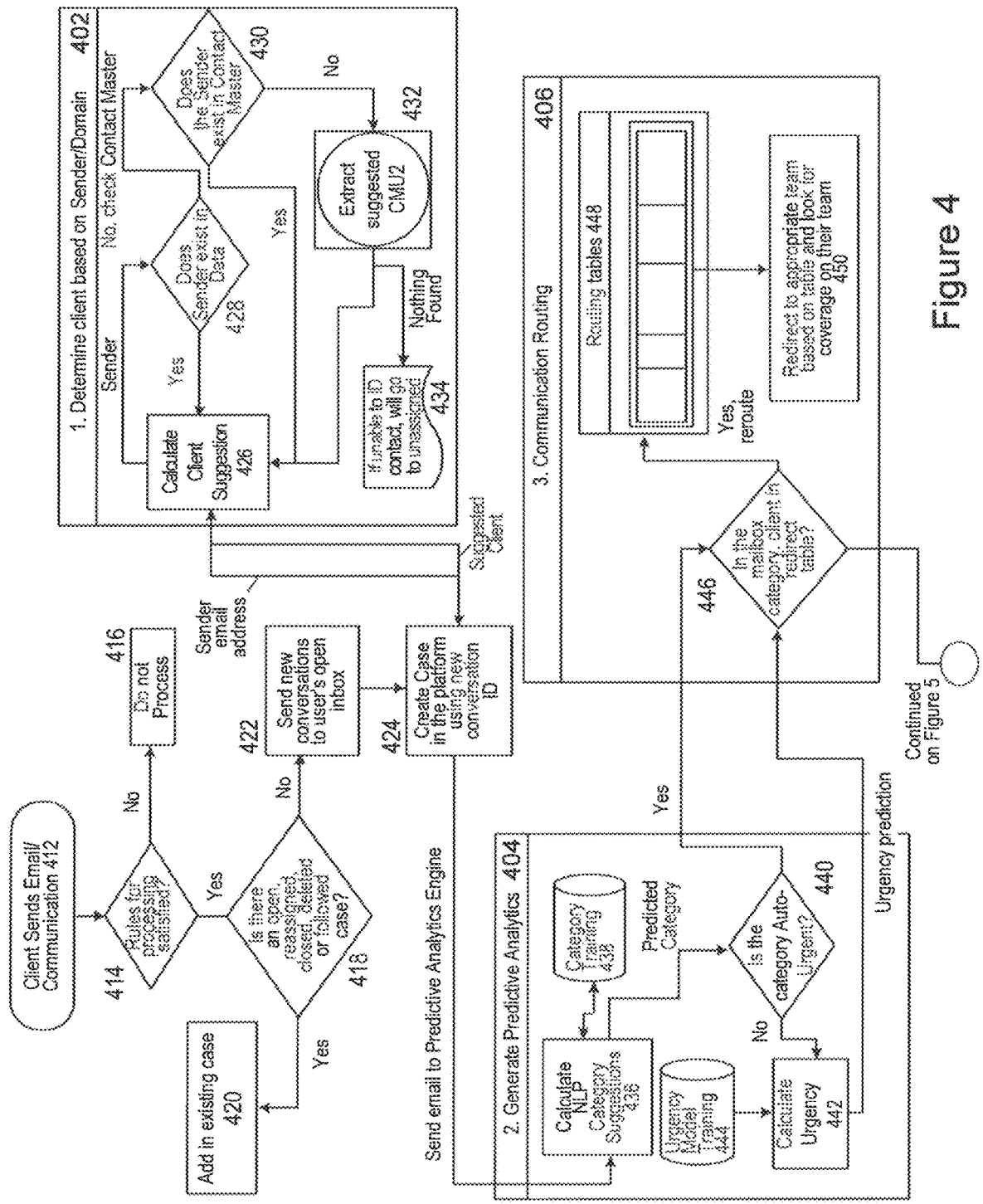
FIGS. 4 and 5 illustrate an exemplary flowchart, according to an embodiment of the present invention.
Figure 5:
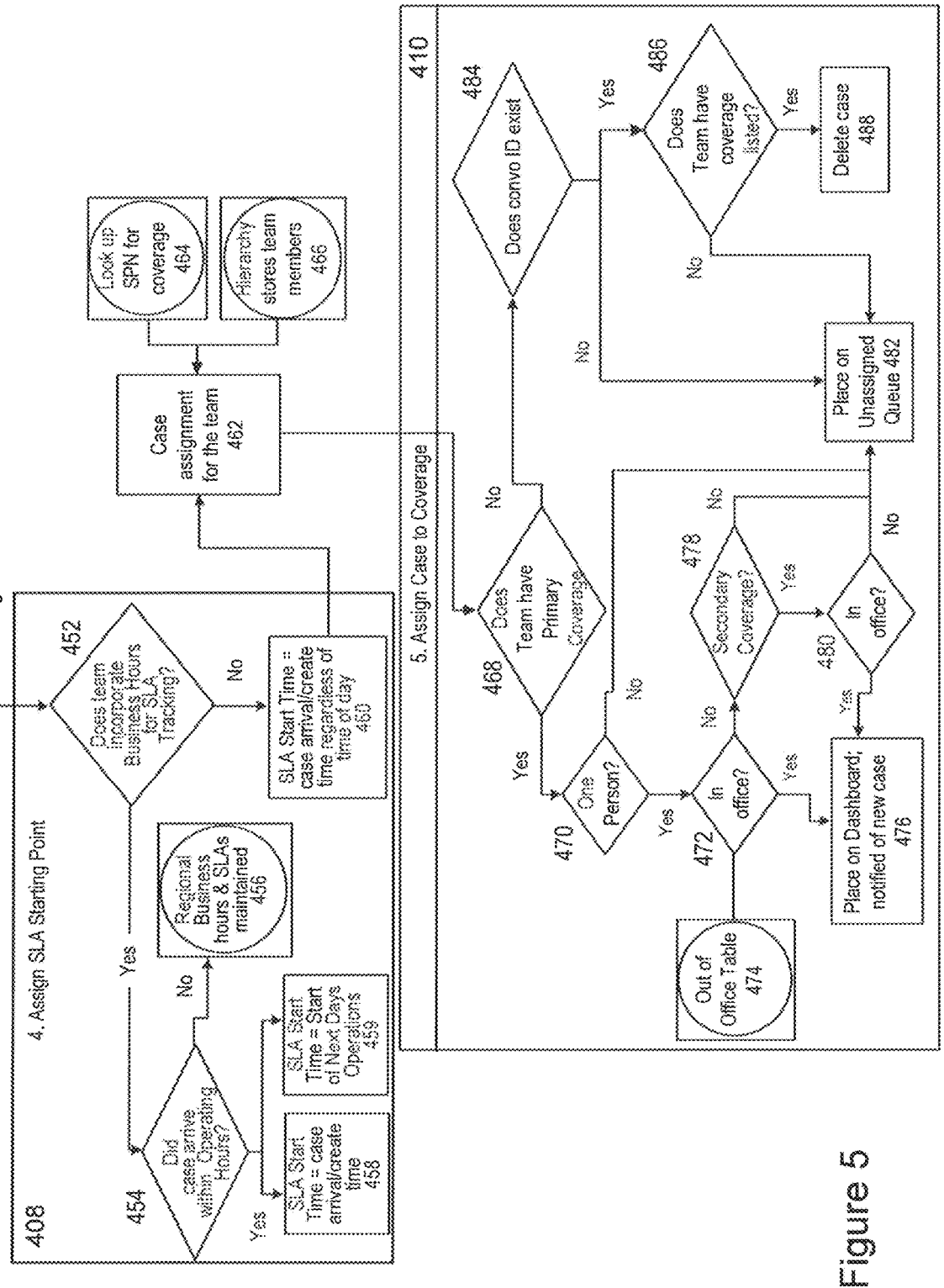

FIGS. 4 and 5 illustrate an exemplary flowchart, according to an embodiment of the present invention. An embodiment of the present invention comprises determining client based on sender or domain at 402; generating predictive analysis at 404; communication routing at 406; assigning service level agreements (SLA) starting point at 408 and assigning a case to coverage at 410. The order illustrated in FIGS. 4 and 5 is merely exemplary. While the process of FIGS. 4 and 5 illustrates certain steps performed in a particular order, it should be understood that the embodiments of the present invention may be practiced by adding one or more steps to the processes, omitting steps within the processes and/or altering the order in which one or more steps are performed. In addition, FIGS. 4 and 5 illustrate an exemplary scenario involving a middle office team. However, the various embodiments of the present invention may be applied to other teams, uses, scenarios and applications and are not limited to a specific implementation.

As shown in FIG. 4, a client may send a communication, such as an email at step 412. The system may determine whether rules for processing are satisfied at step 414. If rules are not satisfied, the communication is not processed at 416. If yes, the system may determine whether there is an open, reassigned, closed, deleted or followed case. If yes, the communication may be added to an existing case at 420. If not, the new conversation may be sent to an open inbox at 422. The system may create a case in the platform using a new conversation identifier at 424. A sender identifier, e.g., email address, may be used to identify or calculate a client suggestion at 426. The system may determine whether the sender exists or is otherwise known at 428. If no, a contact master may be checked at 430. If not, a suggested client identifier may be extracted. If nothing is found, the contact may go unassigned at 434. Otherwise, a client suggestion and communication may be sent to Predictive Analytics Engine to generate predictive analytics, as shown by 404.

NLP category suggestions may be calculated at 436 using category training data 438. A predicted category may be used to determine whether the category is urgent at 440. Other classifications may be determined. Urgency may be determined at 442 using Urgency Model Training data at 444. Urgency prediction may be sent to Communication Routing at 406.

The system may determine whether the client is in a redirect table at 446. If yes, the communication may be rerouted based on Routing Tables 448 and then redirected to an appropriate team at 450.

The system may then assign a SLA starting point at 408. The system may determine whether the team incorporates business hours for SLA tracking at 452. If yes, the system may determine whether the case arrives during operating hours at 454. If not, regional business hours and SLAs may be maintained at 456. If yes, a SLA start time may be identified at 458 and 459. Otherwise, SLA start time may be defined by case arrival or creation at 460. The case may be assigned at 462. This may involve looking up a client identifier for coverage at 464 and storing team members in a hierarchy at 466.

The case may then be assigned for coverage at 410. The system may determine whether the Team has a primary coverage at 468. If yes, the system may determine if the primary coverage involves a single person at 470. If yes, the system may determine whether that person is in the office at 472 by accessing an Out of Office table at 474 or other resource. If yes, the case may be placed on the identified person's dashboard where the person may be notified at 476. If the person is not in the office (or otherwise not available), the system may determine whether secondary coverage is applicable at 478. If yes, the system may determine whether that person is in the office at 480. If not, the case may be placed in an unassigned queue at 482. The system may determine whether a conversation identifier exists at 484. If yes, the system may determine whether the team has coverage. If yes, the case may be deleted at 488.

Figure 6:
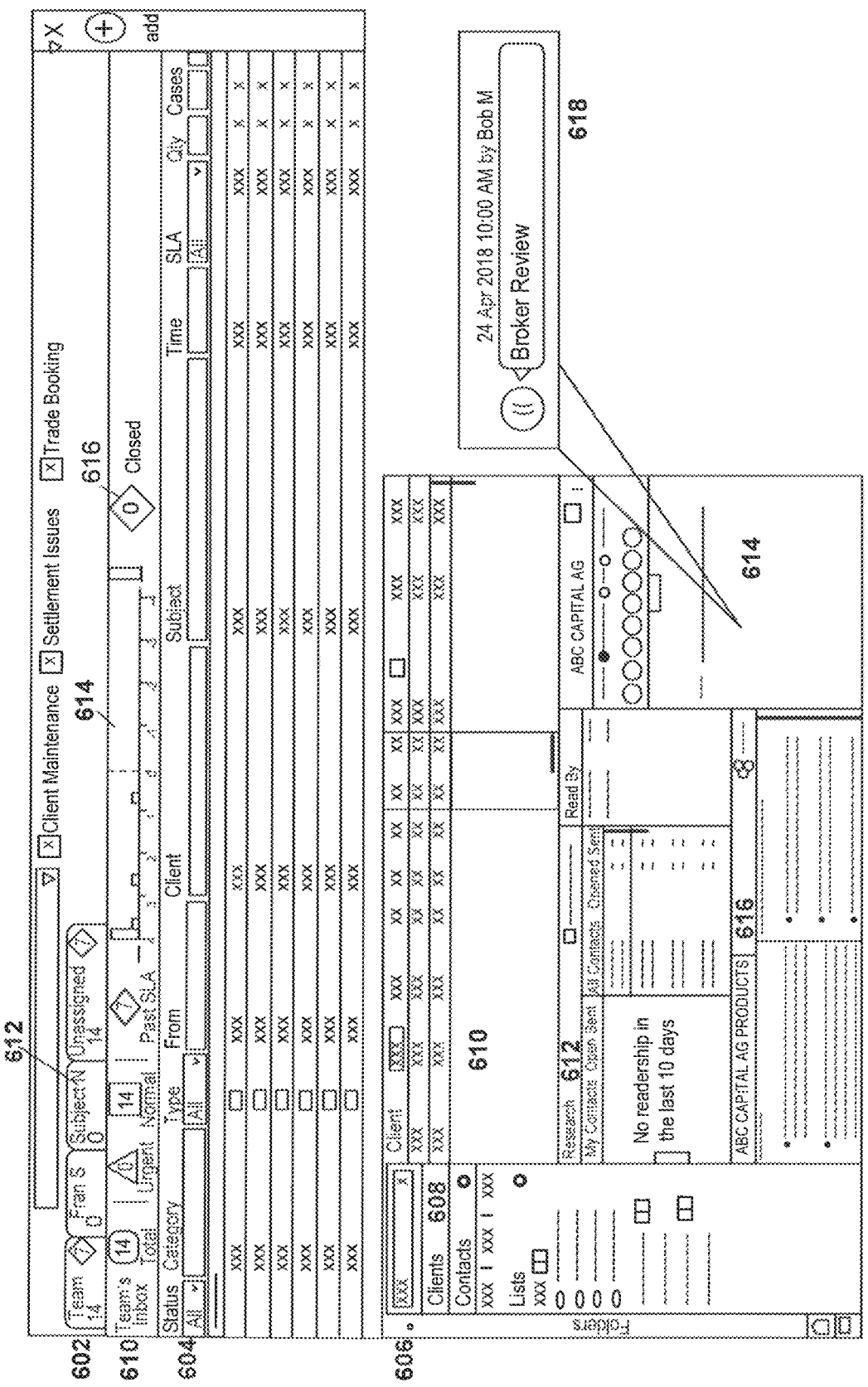
FIG. 6 is an exemplary user interface, according to an embodiment of the present invention.

FIG. 6 is an exemplary user interface, according to an embodiment of the present invention. FIG. 6 illustrates an example of logging an interaction for sales. As shown in FIG. 6, the interface comprises an overview at 602, a detailed view at 604 and a folders view at 606. Team Tab 610 provides a holistic view into the number of open cases, SLA breach and urgent items. The Tabs shown by 612 illustrate intelligent case routing and assignment. Interface 614 provides Service Level Agreement (SLA) histogram representing open cases. Icon 616 represents a number of cases the team closed in one day (or other time period). Detailed View 604 may include data associated with Status, Category, Type, From, Client, Subject, Time, SLA, quantity, Cases, etc. Folder View 606 may include details concerning Clients at 608, including contact information and corresponding communications at 610. Folder View 606 may also include Research 612, product details at 616 and further provides an ability to initiated communication at 614 and 618. Folder view 606 may present the user with a broad spectrum of the client's activities across different businesses, thereby providing a holistic view and insights about the client in order to influence the representative's response to the Client's case.

Figure 7:
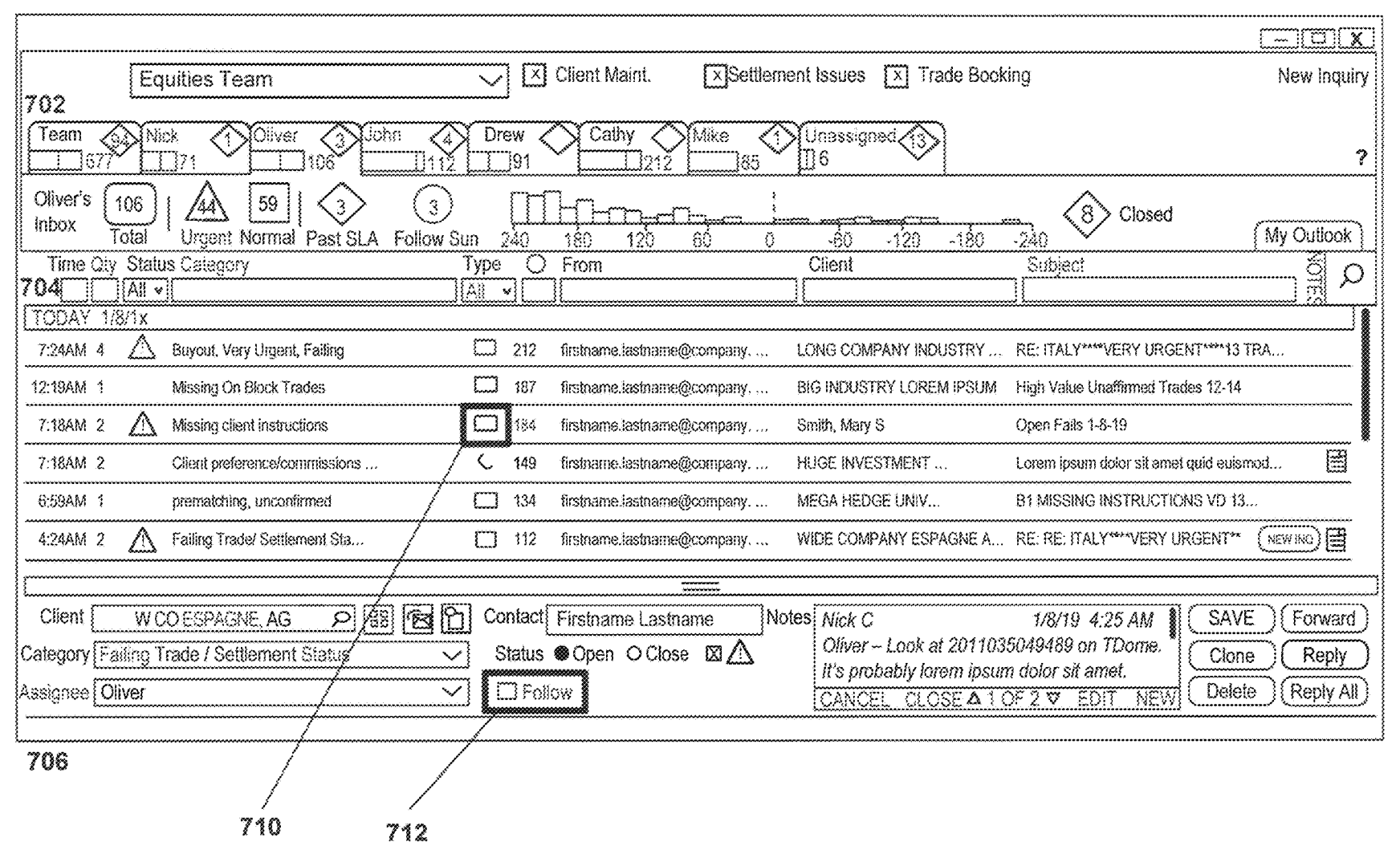

FIG. 7 is an exemplary user interface, according to an embodiment of the present invention. As shown in FIG. 7, the interface comprises an overview at 702, a detailed view at 704 and 706. FIG. 7 illustrates a Follow the Case feature, as shown by 710, 712. Once a case is "followed," it may appear and remain on the "following" User's dashboard to monitor. This may benefit management with added visibility. This feature may allow a case to be tracked across different regions in a "follow the sun" model. For example, an issue may be raised after business hours in one region, and with intelligent routing, a representative from other region may be assigned to the case for a more timely resolution. In this example, notes and/or actions may be logged to make it easier for the origin region to follow through on the resolution with the client.

Figure 8:
FIG. 8 is an exemplary user interface, according to an embodiment of the present invention.

FIG. 8 is an exemplary user interface, according to an embodiment of the present invention. As shown in FIG. 8, the interface comprises an overview at 802, a detailed view at 804 and 806. FIG. 8 illustrates a Manager's View. In this example, a user may view activity for all teams (or a subset of a team). For example, teams may be registered in a hierarchy, and managers may be allowed to view one node, or any set of nodes in their hierarchy. In addition, a senior manager may have the ability to see all nodes in the tree—since they would be registered at the top of the tree.

The foregoing examples show the various embodiments of the invention in one physical configuration; however, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

As described above, the various embodiments of the present invention support a number of communication devices and components, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, JavaScript and/or Python. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

In the system and method of exemplary embodiments of the invention, a variety of "user interfaces" may be utilized to allow a user to interface with the mobile devices or other personal computing device. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A system that implements an intelligent customer service query management and routing system, the system comprising:
    one or more processors; and memory, wherein the memory stores computer-readable instructions that, when executed by the one or more processors, cause the one or more processors to:
    receive, via a communications server, a query from a client;
    apply, via a predictive analytics engine, predictive analytics to the query, wherein the predictive analytics engine further applies data enrichment that fetches associated metadata;
    provide, via a management platform dashboard, an interface for a customer service representative to provide feedback to the predictive analytics engine, wherein the management platform dashboard simultaneously comprises a plurality of icons, a plurality of links to contact information for various queries that each distinctly correspond to one of the plurality of links, a plurality of indications that display various statistics about queries that have been received, and a display of information about routing of the queries that have been received;

build, monitor, optimize and deploy, via a periodic model build processing component, one or more predictive models executed by the predictive analytics engine;

cache, via the memory, current training data to ensure that predictions are made in real-time;

phase out, via the memory, irrelevant training data;

receive, from the periodic model build processing component, a signal that indicates that the periodic model build processing component is ready to load the current training data;

retrieve the current training data from a cache of the memory;

use the current training data to retrain, via the periodic model build processing component, the one or more predictive models on a periodic basis; and make, via the predictive analytics engine, real-time predictions by applying tags to the query, virtually immediately after receiving the query.

2. The system of claim 1, wherein the management platform dashboard comprises a service level agreements (SLA) tracker to track client query SLA to allow prioritization.

3. The system of claim 1, wherein the query comprises an electronic communication initiated by a customer.

4. The system of claim 1, wherein the predictive analytics engine applies natural language processing.

5. The system of claim 1, wherein the predictive analytics engine is in communication with a database to store predictions and associated parsed details.

6. The system of claim 5, wherein the database stores and manages the predictions, training data, metadata, model metrics and historic trend data.

7. The system of claim 1, wherein the computer-readable instructions, when executed by the one or more processors, further cause the one or more processors to: route, via a router, classifier and prediction component, the query to an individual communication inbox; and wherein the management platform dashboard comprises an intelligent inbox that further comprises the router, classifier and prediction component.

8. The system of claim 1, wherein the management platform dashboard receives input from a customer service representative to address the query.

9. The system of claim 1, wherein the management platform dashboard provides predictive model feedback and modified metadata to a database in communication with the predictive analytics engine.

10. The system of claim 1, wherein the one or more predictive models include an ensemble classifier that comprises at least one from among: a neural net, k-neighbors classifier, a random forest, and several regression models which may be optimized at run time.

11. A method that implements an intelligent customer service query management and routing system, the method comprising:

executing, via one or more processors, computer-readable instructions, wherein the computer-readable instructions are stored in memory; and causing, via the computer-readable instructions, the one or more processors to:

receive, via a communications server, a query from a client;

apply, via a predictive analytics engine, predictive analytics to the query, wherein the predictive analytics engine further applies data enrichment that fetches associated metadata;

provide, via a management platform dashboard, an interface for a customer service representative to provide feedback to the predictive analytics engine, wherein the management platform dashboard simultaneously comprises a plurality of icons, a plurality of links to contact information for various queries that each distinctly correspond to one of the plurality of links, a plurality of indications that display various statistics about queries that have been received, and a display of information about routing of the queries that have been received;

execute a periodic model build processing component that builds, monitors, optimizes and deploys one or more predictive models;

cache, via the memory, current training data to ensure that predictions are made in real-time;

phase out, via the memory, irrelevant training data;

receive, from the periodic model build processing component, a signal that indicates that the periodic model build processing component is ready to load the current training data;

retrieve the current training data from a cache of the memory;

use the current training data to retrain, via the periodic model build processing component, the one or more predictive models on a periodic basis; and make, via the predictive analytics engine, real-time predictions by applying tags to the query, virtually immediately after receiving the query.

12. The method of claim 11, wherein the one or more predictive models include an ensemble classifier that comprises at least one from among: a neural net, k-neighbors classifier, a random forest, and several regression models which may be optimized at run time.

13. The method of claim 11, wherein the management platform dashboard comprises a service level agreements (SLA) tracker to track client query SLA to allow prioritization.

14. The method of claim 11, wherein the query comprises an electronic communication initiated by a customer.

15. The method of claim 11, wherein the predictive analytics engine applies natural language processing.

16. The method of claim 11, wherein the predictive analytics engine is in communication with a database to store predictions and associated parsed details.

17. The method of claim 16, wherein the database stores and manages the predictions, training data, metadata, model metrics and historic trend data.

18. The method of claim 11, wherein the computer-readable instructions executed by the one or more processors, further cause the one or more processors to: route, via a router, classifier and prediction component, the query to an individual communication inbox; and wherein the management platform dashboard comprises an intelligent inbox that further comprises the router, classifier and prediction component.

19. The method of claim 11, wherein the management platform dashboard receives input from a customer service representative to address the query.

20. The method of claim 11, wherein the management platform dashboard provides predictive model feedback and modified metadata to a database in communication with the predictive analytics engine.

* * * * *